United States Patent
Miura et al.

(10) Patent No.: US 7,245,413 B2
(45) Date of Patent: Jul. 17, 2007

(54) LIGHT MODULATION APPARATUS AND LIGHT MODULATOR CONTROL METHOD

(75) Inventors: Akira Miura, Musashino (JP); Kenji Uchida, Musashino (JP); Katsuya Ikezawa, Musashino (JP); Hiroyuki Matsuura, Musashino (JP); Akira Toyama, Musashino (JP); Toshiaki Kobayashi, Musashino (JP); Tsuyoshi Yakihara, Musashino (JP); Kousuke Doi, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/527,561

(22) Filed: Sep. 27, 2006

(65) Prior Publication Data
US 2007/0070488 A1 Mar. 29, 2007

(30) Foreign Application Priority Data
Sep. 29, 2005 (JP) ............................. 2005-284864

(51) Int. Cl.
*G02F 1/03* (2006.01)
(52) U.S. Cl. ..................... 359/245; 359/239; 359/248
(58) Field of Classification Search ................ 359/245, 359/238, 239, 242, 248, 250, 252, 254
See application file for complete search history.

(56) References Cited

U.S. PATENT DOCUMENTS

2005/0058460 A1* 3/2005 Wang .......................... 398/195

2005/0128556 A1 6/2005 Jang et al.

FOREIGN PATENT DOCUMENTS

| EP | 0 547 394 | 6/1993 |
|---|---|---|
| EP | 1 168 041 | 1/2002 |
| EP | 1 324 102 | 2/2003 |
| JP | 2642499 B2 | 5/1997 |
| JP | 3398929 B2 | 2/2003 |

OTHER PUBLICATIONS

Great Britain Search Report.

* cited by examiner

*Primary Examiner*—Timothy Thompson
(74) *Attorney, Agent, or Firm*—Sughrue Mion, PLLC

(57) ABSTRACT

A light modulation apparatus including a Mach-Zehnder type light modulator, a driver for modulator outputting a control signal according to an input electric signal, a light branching circuit branching the output light signal, and a bias control circuit applying a bias voltage to the light modulator based on the branched light signal, the apparatus further comprises: a burst pause state detection circuit detecting a pause state of a burst signal included in the input electric signal; a photoelectric transducer converting an output light signal branched by the light branching circuit into an electric signal; a sampling circuit extracting the electric signal converted while the pause state is detected by the burst pause state; and a bias voltage adjustment circuit adjusting a bias voltage value of the bias voltage based on a voltage level of the extracted electric signal.

5 Claims, 4 Drawing Sheets

LIGHT MODULATION APPARATUS AND LIGHT MODULATOR CONTROL METHOD

BACKGROUND OF THE INVENTION

1. Field of the Invention

The present invention relates to a light modulation apparatus and a light modulator control method of an external modulation system used for light communication systems, and more particularly to a light modulation apparatus and a light modulator control method using a Mach-Zehnder type light modulator.

2. Description of Related Art

In recent years, as the light communication systems have advanced, a light modulation apparatus capable of stably outputting a high frequency output light signal (light pulses) has been demanded. For example, a light modulation apparatus equipped with an external modulator such as an electro-absorption (EA) modulator, an LN modulator using a material having an electro-optical effect (Pockels effect) of lithium niobate ($LiNbO_3$) or the like as a substrate, or the like has been put to practical use.

FIG. 3 is a diagram showing the configuration of a light modulation apparatus 100 using the EA modulator mentioned above.

As shown in FIG. 3, the light modulation apparatus 100 is composed of an EA modulator 21 modulating and outputting light having entered therein from a light source 11 such as a laser diode or the like, and a driver 22 for EA modulator, which controls the operation relative to the light modulation of EA modulator 21 according to the logical level of an electronic signal input from the outside.

The EA modulator 21 is an electro-absorption type light modulator performing absorption or transmission of light according to a control signal input from the driver 22 for EA modulator. When an input electric signal input from the outside has a low level, the driver 22 for EA modulator outputs a control signal to make the EA modulator 21 absorb the light input from the light source 11 so as to make the output light output from the EA modulator 21 be in an extinction (off) state. Moreover, when an electric signal input from the outside has a high level, the driver 22 for EA modulator outputs a control signal to make the EA modulator 21 transmit the light input from the light source 11 so as to make the output light output from the EA modulator 21 be in a lighted (on) state.

Although the EA modulator 21 has an advantage of not generating any temperature drifts and any drifts with time, the EA modulator 21 has a problem of the inferiority of the extinction ratio which is a ratio of the light intensity of an on-state to the light intensity of an off-state of an output light signal, and has a problem of the inferiority of a waveform quality of the output light signal. Consequently, there is the possibility of generating an error at the time of a light communication.

FIG. 4 is a diagram showing the configuration of a light modulation apparatus 100 using the LN modulator mentioned above.

As shown in FIG. 4, the light modulation apparatus 100 is composed of an LN modulator 12 modulating the light input from the light source 11 such as a laser diode or the like to output the modulated light as an output light signal, a driver 13 for LN modulator, which controls the operations relative to the light modulation of the LN modulator 12 according to the logical level of the input electric signal input from the outside, an optical branching circuit 15 branching the output light signal output from the LN modulator 12, and a bias control circuit 19 adjusting a bias point of the LN modulator 12 based on the output light signal branched by the optical branching circuit 15.

The LN modulator 12 is a Mach-Zehnder type light modulator, which branches the light entered from the light source 11 into two lights, changes the branched lights in correspondence with the control signal input from the driver 13 for LN modulator, and multiplexing the two lights into one light again after that to output the multiplexed light. When an input electric signal input from the outside is the low level, the driver 13 for LN modulator applies a control signal to change the phases of the two lights branched in the LN modulator 12 to be different from each other by the degree of π, to the LN modulator 12 as an RF voltage, and thereby makes the two lights be multiplexed in the opposite phase to each other to make the output light signal be in an extinction (off) state. Moreover, when an electric signal input from the outside is the high level, the driver 13 for LN modulator applies a control signal to change the phases of the two lights branched in the LN modulator 12 to agree with each other, to the LN modulator 12 as the RF voltage, and thereby multiplexes the two lights in the same phase to make the output light signal be in the lighted (on) state.

Hereupon, as the control signal input from the driver 13 for LN modulator, a no return to zero (NRZ) signal and a return to zero (RZ) signal, which are severally continuously generated and have an almost constant mark rate (a rate of the low level to the high level), are used. Moreover, the light modulation apparatus can be used in a mode in which the capacitance of a capacitor or the like are connected between the LN modulator 12 and the driver 13 for LN modulator because the connection brings about the advantages of arbitrary setting the bias value in the inside of the driver 13 for LN modulator, and the like.

Although the light modulating apparatus using the LN modulator has the advantages of being excellent in the extinction ratio and of the realizability of a wide area ideal light modulation having no chirping in comparison with those of the light modulating apparatus using the EA modulator, the light modulating apparatus using the LN modulator has a problem of the deterioration of the accuracy of the output light signal thereof because temperature drifts and drifts with time are generated. Accordingly, the bias control circuit 19 suppresses the generation of the drifts by applying a bias voltage (DC voltage) so that the middle point (middle point between the maximum output and the minimum output) of a characteristic curve of light modulation by the LN modulator 12 may become the bias point based on the output light signals which have been branched by the optical branching circuit 15. Moreover, as conventional techniques about the adjustment of the bias point of a light modulator, Japanese Patents No. 2642499 and No. 3398929 have been proposed, for example.

There is a demand of operating the light modulation apparatus mentioned above in a burst mode on account of a system and of dealing with further speeding up. In the burst mode, states can be divided broadly into the states (hereinafter each referred to a burst state) in each of which a series of output light signals in the on-state (hereinafter each referred to as a burst signal) is intermittently output, and the states (hereinafter each referred to as a burst pause state) in each of which an output light signal in the off-state continues (see FIG. 2). In this case, because the LN modulator cannot be efficiently operated when the center point of the characteristic curve of the light modulation mentioned above is set as the bias point, it is necessary to set the bias point at a point where the light intensity of the output light signal becomes the weakest extinction state (glimmer).

However, in the techniques described in the Japanese Patents No. 2642499 and No. 3398929 mentioned above, because the operation at the time of the burst mode, in which the mark rate is not constant, is not taken into consideration, there is a problem in which it is impossible to continue controlling the point where the light intensity of the output light signal becomes the weakest extinction state as the bias point, and to perform the efficient modulation of the output light signal.

SUMMARY OF THE INVENTION

It is an object of the present invention to provide a light modulation apparatus and a light modulator control method which can adjust the bias point of a light modulator to a suitable position-at the time of a burst mode.

In order to solve the above-described problem, in accordance with a first aspect of the invention, the light modulation apparatus includes a Mach-Zehnder type light modulator performing modulation of a light entered from a light source to output the modulated light as an output light signal, a driver for modulator outputting a control signal for controlling an operation related to the modulation according to an input electric signal input from an outside to the light modulator, a light branching circuit branching the output light signal output from the light modulator, and a bias control circuit applying a bias voltage to the light modulator based on the branched output light signal, and the apparatus further comprises:

a burst pause state detection circuit detecting a pause state of a burst signal included in the input electric signal;

a photoelectric transducer converting an output light signal branched by the light branching circuit into an electric signal;

a sampling circuit extracting the electric signal converted by the photoelectric transducer while the pause state is detected by the burst pause state; and a bias voltage adjustment circuit adjusting a bias voltage value of the bias voltage based on a voltage level of the extracted electric signal.

In accordance with a second aspect of the invention, the light modulator control method for a light modulation apparatus which includes a Mach-Zehnder type light modulator performing modulation of a light entered from a light source to output the modulated light as an output light signal, a driver for modulator outputting a control signal for controlling an operation related to the modulation according to an input electric signal input from an outside to the light modulator, a light branching circuit branching the output light signal output from the light modulator, and a bias control circuit applying a bias voltage to the light modulator based on the branched output light signal, the method comprises the steps of:

detecting a pause state of a burst signal included in the input electric signal;

converting an output light signal branched by the light branching circuit into an electric signal;

extracting the electric signal converted by the photoelectric transducer while the pause state is detected by the burst pause state; and adjusting a bias voltage value of the bias voltage based on a voltage level of the extracted electric signal.

Because the bias voltage value of the bias voltage applied by the bias control circuit can be thereby adjusted based on the voltage level of the electric signal during the pause states of the burst signal, the bias point of the light modulator can be adjusted at the suitable position in the burst mode.

Preferably, in the first or second aspect of the invention, the adjusting the bias voltage value sets a plurality of bias voltage values different from one another, and compares voltage levels of electric signals extracted according to the plurality of bias voltage values with one another to specify a bias voltage value by which the voltage levels take a minimum or a maximum.

Thereby, a plurality of bias voltage values different from one another is set, and the voltage levels of electric signals taken according to the plurality of bias voltage values are compared with one another. Consequently, the bias voltage value by which the voltage level becomes the minimum or the maximum is specified. Thereby, the bias voltage value by which the light intensity of the output light signal becomes the maximum or the minimum can be specified, and consequently the bias point of the light modulator can be adjusted to the suitable position in the burst mode.

Preferably, in the first aspect of the invention, the light modulator and the driver for modulator are connected to each other by direct-current coupling.

Because the light modulator and the driver for modulator are thereby coupled by direct-current coupling, the deterioration of the waveform quality of the control signal transmitted from the driver for modulator can be suppressed in the burst mode.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE PREFERRED EMBODIMENTS

In the following, the best mode for implementing the present invention is described with reference to the attached drawings. However, the scope of invention is not limited to the shown examples.

Figure 1:
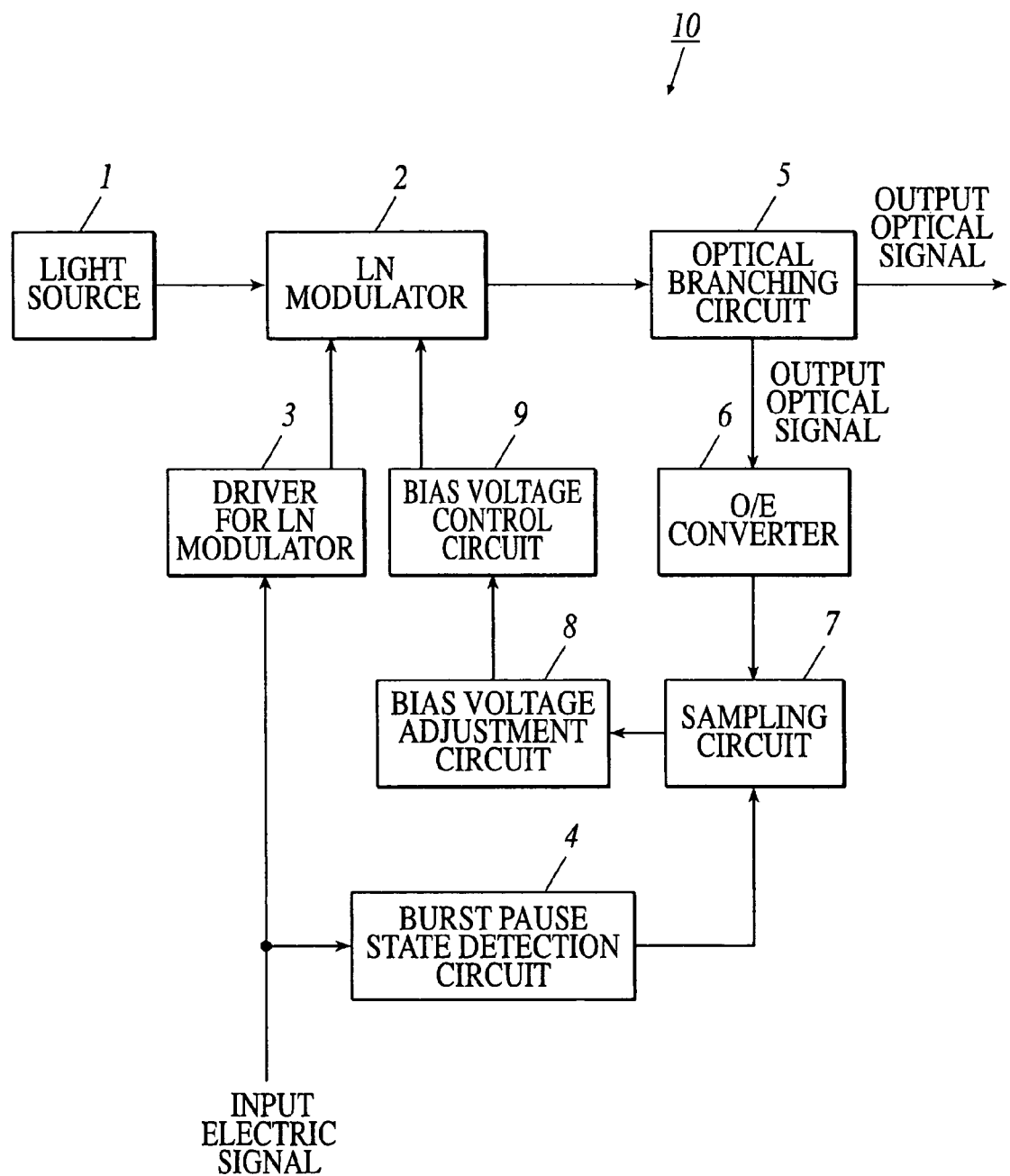
FIG. 1 is a block diagram showing the configuration of a light modulation apparatus.
Figure 4:
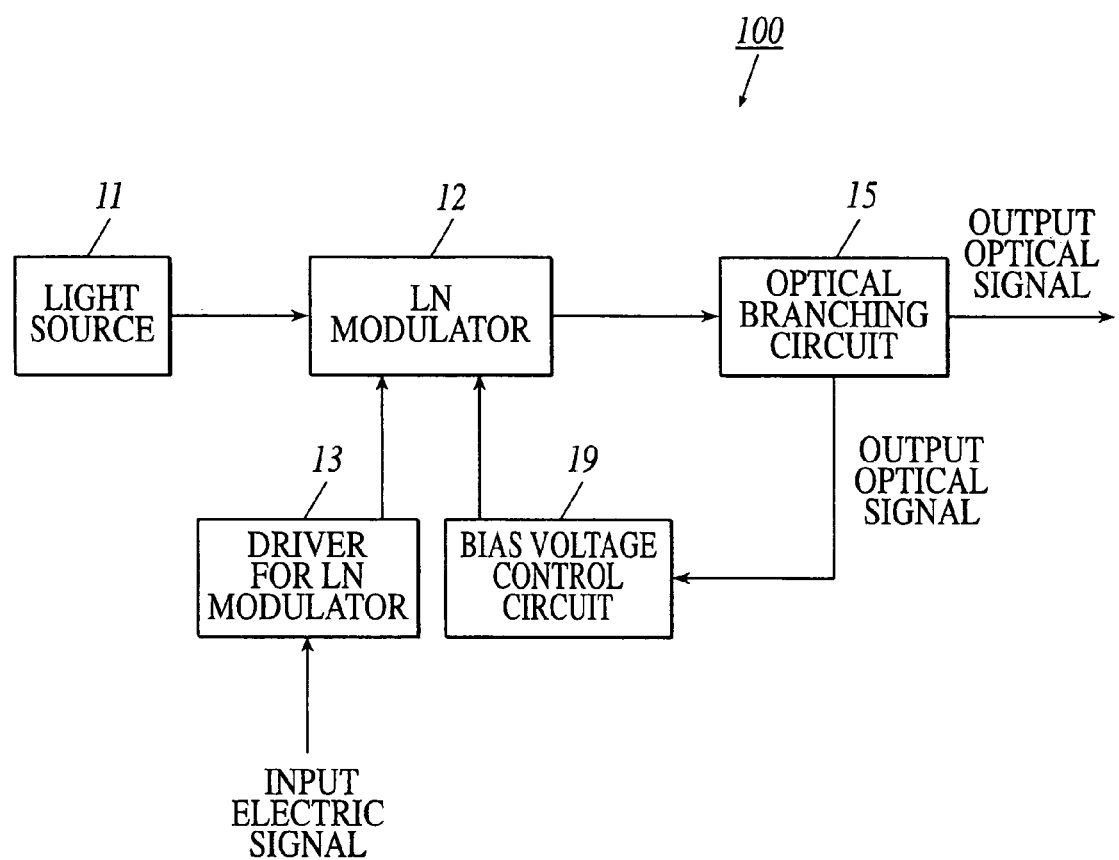
FIG. 4 is a block diagram showing the configuration of a conventional light modulation apparatus using an LN modulator.

First, FIG. 1 is referred to for describing the configuration of the light modulation apparatus 10. In addition, the detailed descriptions of the components similar to the configuration described in FIG. 4 mentioned above are omitted. In the following, the characteristic configurations and operations of the present embodiment are described.

As shown in FIG. 1, the light modulation apparatus 10 is composed of a light source 1, an LN modulator 2, a driver 3 for LN modulator, a burst pause state detection circuit 4, an optical branching circuit 5, an optical/electric (O/E) converter 6, a sampling circuit 7, a bias voltage adjustment circuit 8 and the bias control circuit 9.

The light source 1 is light emission means such as a laser diode, which emits a light of a fixed wavelength (for example, 1500 nm), and makes a light enter the LN modulator 2.

The LN modulator 2 is composed of a substrate made of lithium niobate (LiNbO$_3$) having the electro-optical effect, a Mach-Zehnder type optical waveguide formed on the substrate, an RF electrode pair into which a control signal (RF voltage) for modulating the light passing through the inside of the optical waveguide is input (applied), a DC electrode pair to which a bias voltage (DC voltage) for adjusting the bias point used as the reference of the operation of light modulation is applied (all of which are not shown).

The driver 3 for LN modulator controls the operations relative to the light modulation of the LN modulator 2 by inputting a control signal into the RF electrode pair of the LN modulator 2 by direct-current coupling according to the logical level of an input electric signal input from the outside. In addition, because there is the possibility that an offset which changes with time is generated on the RF voltage applied to the RF electrode pair according to the transient state of the electric charges generated in a capacitor to change the pulse shape of the output light signal in the case where the driver 3 for LN modulator and the RF electrode pair are coupled by capacity coupling with a capacitor or the like put between them in the burst mode, it is preferable to couple the driver 3 for LN modulator and the RF electrode pair with each other by the direct-current coupling.

To put it concretely, when an input electric signal input from the outside into the driver 3 for LN modulator takes the low level, the driver 3 for LN modulator applies an RF voltage to differentiate the phases of the two lights branched in the optical waveguide of the LN modulator 2 by $\pi$ to the RF electrode pair, and thereby makes the two lights be multiplexed on each other in the opposite phase to make the output light signal output from the LN modulator 2 be in the extinction (off) state. Moreover, when an electric signal input from the outside takes the high level, the driver 3 for LN modulator applies an RF voltage to make the phases of the two lights branched in the optical waveguide agree with each other, and makes the two lights be multiplexed on each other in the same phase to make the output light signal output from the LN modulator 2 be in the lighted (on) state.

The burst pause state detection circuit 4 detects a pause state of a burst signal included in an input electric signal to output an indication signal indicating the pause state to the sampling circuit 7. Hereupon, a well-known technique can be used for the detection of the pause state of the burst signal. For example, because the value of the input electric signal in the pause state becomes almost zero for a predetermined time, the value of the input electric signal may be used for the detection of the pause state.

The optical branching circuit 5 is an optical divider of a space type (bulk type; for example, a beam splitter), an optical fiber type or a planar waveguide type for branching the output light signal output from the LN modulator 2 into two lights. The optical branching circuit 5 outputs one of the branched light signals to another apparatus, and outputs the other of the branched light signals to the O/E converter 6. In addition, the number of the output light signals branched by the optical branching circuit 5 is not restricted to the two of the present embodiment.

The O/E converter 6 is a photoelectric transducer such as a photodiode or the like. The O/E converter 6 converts an output light signal input therein from the optical branching circuit 5 into an electric signal to output the converted electric signal to the sampling circuit 7. Hereupon, the voltage level of the converted electric signal corresponds to the light intensity of the output light signal, and shows that the light intensity is stronger as the voltage level is larger. Hereinafter, the electric signal converted by the O/E converter 6 is called as a light intensity signal.

While the indication signal indicating a pause state is input from the burst pause state detection circuit 4 into the sampling circuit 7, the sampling circuit 7 extracts the light intensity signals input from the O/E converter 6 (sampling), and outputs them to the bias voltage adjustment circuit 8.

The bias voltage adjustment circuit 8 is composed of a control circuit of an application specific integrated circuit (ASIC), a central processing unit (CPU) or the like; a storage element such as a cache memory, a RAM, and the like; and the like. The bias voltage adjustment circuit 8 adjusts the voltage value of the bias voltage (hereinafter referred to as a bias voltage value), which the bias control circuit 9 mentioned above applies to the LN modulator 2 based on the voltage level of the light intensity signal input from the sampling circuit 7 thereto.

To put it concretely, the bias voltage adjustment circuit 8 sets a plurality of mutually different bias voltage values, and mutually compares the voltage levels of the light intensity signals extracted according to the plurality of bias voltage values. Thereby, the bias voltage adjustment circuit 8 specifies a bias voltage value by which the voltage level becomes the minimum to set the bias voltage value. In addition, the method of adjusting the bias voltage value will be described later.

The bias control circuit 9 applies a bias voltage corresponding to the bias voltage value set by the bias voltage adjustment circuit 8 to the DC electrode pair of the LN modulator 2 to control the bias point of the LN modulator 2.

Next, the method of adjusting the bias voltage value, which is executed by the bias voltage adjustment circuit 8 at the time of the burst mode, is described with reference to FIGS. 2A and 2B.

Figure 2A:
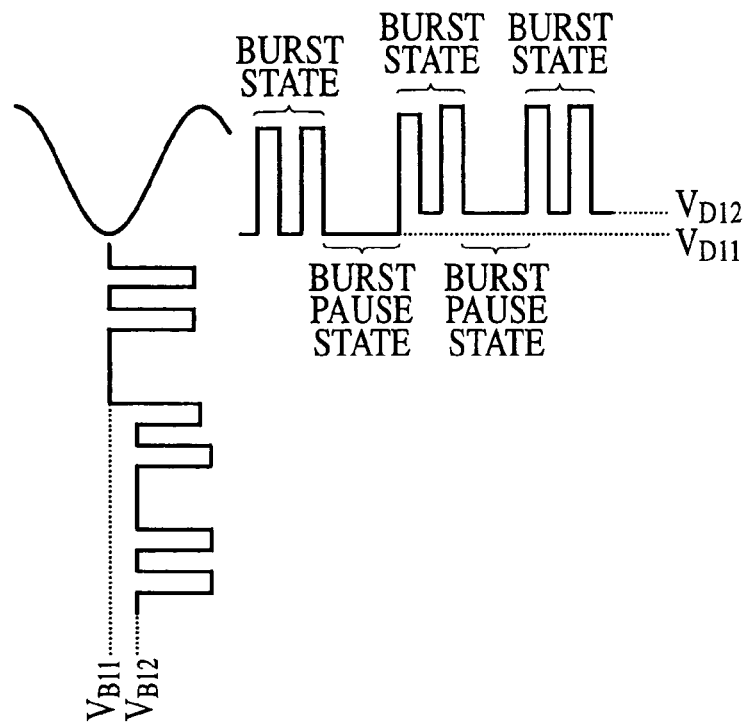
FIGS. 2A and 2B are diagrams for illustrating a method for setting a bias voltage value.
Figure 2B:
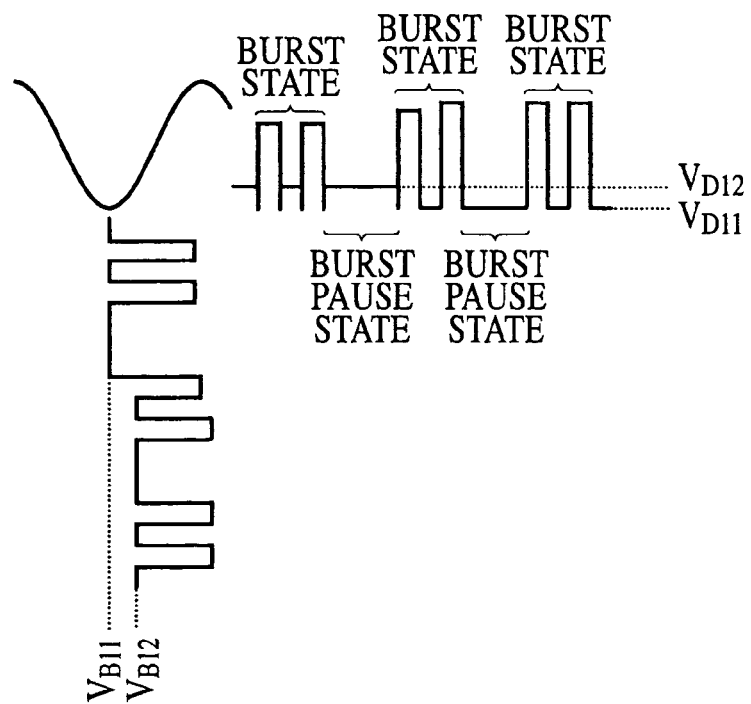
Figure 3:
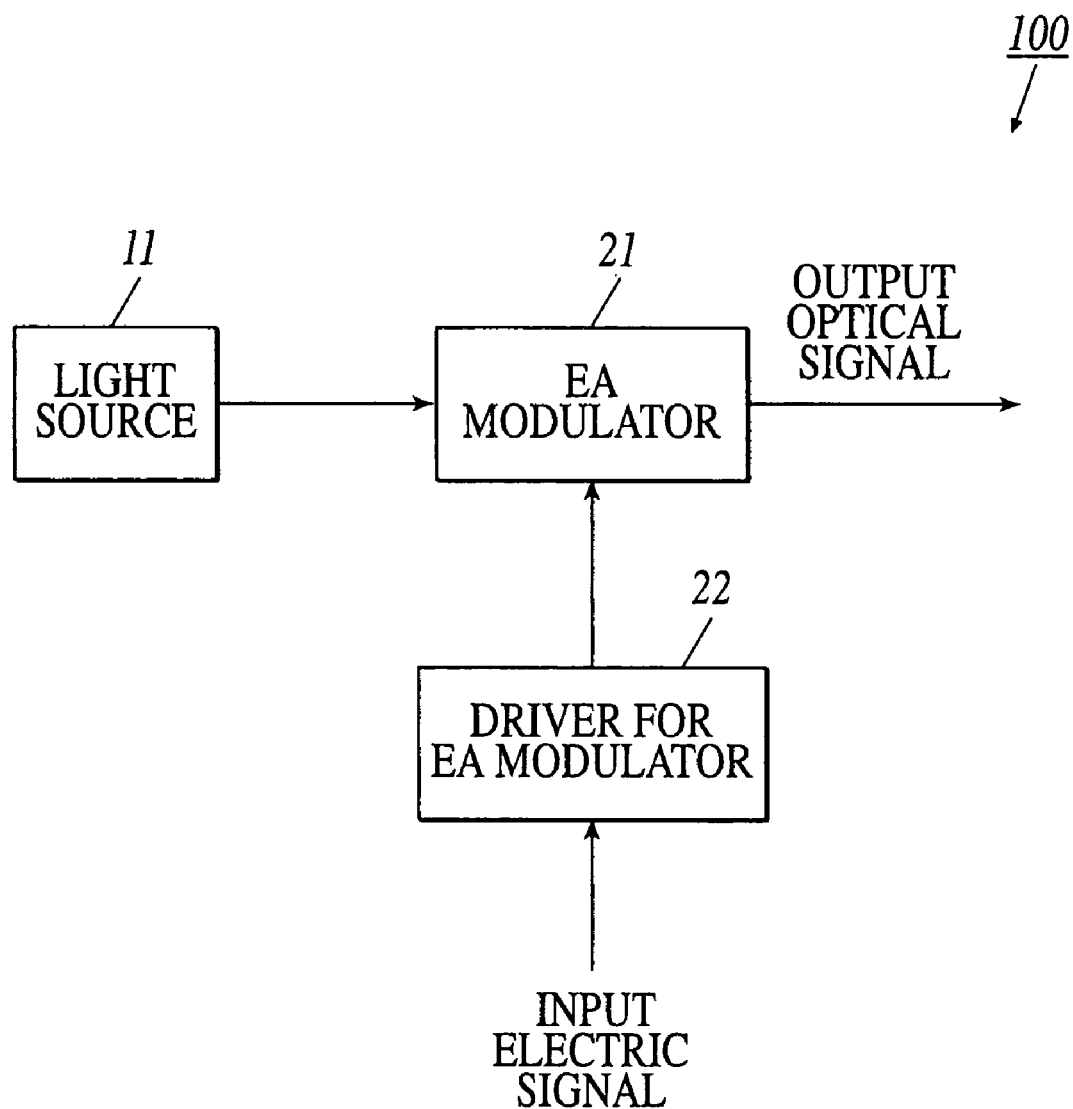
FIG. 3 is a block diagram showing the configuration of a conventional light modulation apparatus using an EA modulator.

FIGS. 2A and 2B are diagrams for illustrating the method of setting a bias voltage value. In the diagrams, the waveforms of sine waves shown on the upper left sides indicate input output characteristics of the LN modulator 2.

The waveforms shown under the input output characteristics show the sums of control signals (RF voltages) applied to the LN modulator 2 and bias voltages (DC voltages), and the voltages of the base parts, in which no pulse waves are produced, correspond to the bias voltage values set by the bias voltage adjustment circuit 8. In addition, the elapse of time is shown from the upper parts to the lower parts in the diagrams.

Moreover, the waveforms shown in the right sides of the input output characteristics indicate the output light signals (light intensity signals) output from the LN modulator 2 and converted by the O/E converter 6, and their voltage levels mean the light intensities of the output light signals. That is, the base parts of the present waveforms indicate extinction states. In addition, the elapse of time is also shown from the left sides to the right sides in the diagrams.

As mentioned above, it is necessary to set the bias point of the LN modulator 2 at the point where the light intensity of the output light signal becomes the weakest extinction state (glimmer) at the time of the burst mode in order to operate the LN modulator 2 efficiently. However, in the LN modulator 2, the reference position (bias point) where the light intensity becomes the extinction state is displaced owing to the occurrences of a temperature drift and a drift with time, and accordingly the adjustment of the bias point, namely the adjustment of the bias voltage value to be applied as the bias voltage, is performed by the bias voltage adjustment circuit 8.

First, the burst pause state detection circuit 4 detects a pause state of a burst signal. When the light intensity signal of the output light signal output from the LN modulator 2 is output from the sampling circuit 7 to the bias voltage adjustment circuit 8, the bias voltage adjustment circuit 8 makes a not shown storage element temporarily store the voltage level ($V_{D11}$) of the input light intensity signal and the bias voltage value ($V_{B11}$) set now in association with each other.

Here, when the bias voltage adjustment circuit 8 sets a new bias voltage value ($V_{B12}$) different from the present bias voltage value ($V_{B11}$), the light intensity signal of the output light signal corresponding to the new bias voltage value ($V_{B12}$) is extracted by the sampling circuit 7 to be output to the bias voltage adjustment circuit 8. Although the method of deriving the new bias voltage value is not especially restricted, for example, the new bias voltage value may be acquired by adding or subtracting a predetermined voltage amount to the present bias voltage value.

Next, the bias voltage adjustment circuit 8 makes the not shown storage element temporarily store the voltage level ($V_{D12}$) of the input light intensity signal and the bias voltage value ($V_{B12}$) set now in association with each other. Then, the bias voltage adjustment circuit 8 compares the temporarily stored voltage levels ($V_{D11}$) and ($V_{D12}$) with each other to specify a bias voltage value stored in the storage element in the state of being associated with the light intensity signal of the smaller voltage level between both the light intensity signals.

For example, because a relation of $V_{D11} < V_{D12}$ is satisfied in the case of FIG. 2A, the bias voltage value ($V_{B11}$), which has been temporarily stored in association with the voltage level $V_{D11}$ is specified. Moreover, because the relation of $V_{D11} > V_{D12}$ is satisfied in the case of FIG. 2B, the bias voltage value ($V_{B12}$), which has been temporarily stored in association with the voltage level $V_{D12}$, is specified.

Successively, the bias voltage adjustment circuit 8 calculates and sets a new bias voltage value ($V_{D13}$) different from the bias voltage values ($V_{B11}$ and $V_{B12}$) corresponding to the voltage levels ($V_{D11}$ and $V_{D12}$), respectively, of the light intensity signals, which have been comparison objects previously, based on the following formula (1). Hereupon, a bias voltage value $V_{BS}$ indicates the bias voltage value corresponding to the light intensity signal of the smaller voltage level between the light intensity signals of the comparison objects. Moreover, a bias voltage value $V_{BB}$ indicates the bias voltage value corresponding to the light intensity signal of the larger voltage value between the light intensity signals of the comparison objects.

$$V_{B13} = V_{BS} - (V_{BB} - V_{BS}) = 2 \times V_{BS} - V_{BB} \quad (1)$$

For example, in the case of FIG. 2A, the bias voltage value ($V_{B13}$) is calculated based on the following formula (2), and in the case of FIG. 2B, the bias voltage value ($V_{B13}$) is calculated based on the following formula (3).

$$V_{B13} = V_{B11} - (V_{B12} - V_{B11}) = 2 \times V_{B11} - V_{B12} \quad (2)$$

$$V_{B13} = V_{B12} - (V_{B11} - V_{B12}) = 2 \times V_{B12} - V_{B11} \quad (3)$$

Next, when the light intensity signal corresponding to the bias voltage value ($V_{B13}$) is extracted by the sampling circuit 7 and is output to the bias voltage adjustment circuit 8, the bias voltage adjustment circuit 18 makes the not shown storage element temporarily store the voltage level ($V_{D13}$) of the input light intensity signal and the bias voltage value ($V_{B13}$) set now in association with each other.

Then, the bias voltage adjustment circuit 8 compares the temporarily stored voltage levels ($V_{DS}$) and ($V_{D13}$) of the light intensity signals with each other, and specifies the bias voltage value stored in association with the light intensity signal of the smaller voltage value between both the light intensity signals. Hereupon, the voltage level $V_{DS}$ indicates the voltage level of the light intensity signal judged to be smaller one at the time of the previous comparison. For example, in the case of FIG. 2A, the largeness relation between the voltage levels $V_{D11}$ and $V_{D13}$ is compared. Moreover, in the case of FIG. 2B, the largeness relation between the voltage levels $V_{D12}$ and $V_{D13}$ is compared.

The bias voltage adjustment circuit 8 sequentially calculates new bias voltage values ($V_{B14}$, $V_{B15}$, ...) based on the formula (1) by the similar way mentioned above, and sequentially executes the comparison of the voltage level of the light intensity signal acquired according to each of the bias voltage values calculated by the calculations with the voltage level of the light intensity signal judged to be smaller one at the preceding comparison to specify and set the bias voltage value by which the voltage level of the light intensity signal becomes the minimum.

In addition, the adjustment method is not limited to the one mentioned above, but the bias voltage value by which the voltage value (light intensity) of the light intensity signal becomes the minimum may be acquired by other setting methods.

As mentioned above, according to the present embodiment, because it is possible to adjust the bias voltage value of the bias voltage which is applied by the bias control circuit based on the voltage level of a light intensity signal during a period of a pause state of the burst signal, it is possible to adjust the bias point of the light modulator at a suitable position at the time of the burst mode. Moreover, a plurality of mutually different bias voltage values are set, and the voltage levels of the light intensity signals extracted according to the plurality of bias voltage values are mutually compared to specify the bias voltage value by which the voltage level become the minimum. Because it is thereby possible to specify the bias voltage value by which the light intensity of an output light signal becomes the minimum, the bias point of the light modulator can be adjusted to a suitable position at the time of the burst mode.

In addition, the application of the present invention is not limited to the example mentioned above, but the application can be suitably changed in the scope which does not depart from the present invention.

For example, although the control signal (RF voltage) and the bias voltage (DC voltage) are separately applied through the RF electrode pair and the DC electrode pair of the LN modulator 2 in the embodiment mentioned above, the configuration is not limited to the above one, but both the voltages (RF voltage and DC voltage) may be superimposed on each other to be applied using a function element such as Bias Tee or the like.

Moreover, the aspect of providing the external O/E converter 6 separately is shown in the embodiment mentioned above. But, when the LN modulator 2 includes a built-in O/E converter, an aspect of using the built-in O/E converter may be adopted. In this case, total reflection conditions are satisfied at the multiplexing point in the optical waveguide at the time of the extinction of the output light signal, and the built-in O/E converter detects the light diffused into the LN modulator 2. Consequently, the light intensity signal output from the O/E converter shows the maximum value of the light intensity in the extinction state of the output light signal. Moreover, the light intensity signal output from the O/E converter shows the lowermost value of the light intensity in the lighted state of the output light signal. Accordingly, contrary to the embodiment mentioned above, the control of the bias voltage value is performed so that the point at which the light intensity of the light output becomes the maximum may be the bias point.

The entire disclosure of Japanese Patent Application No. 2005-284864 filed on Sep. 29, 2005, including description, claims, drawings and summary are incorporated herein by reference in its entirety.

What is claimed is:

1. A light modulation apparatus including a Mach-Zehnder type light modulator performing modulation of a light entered from a light source to output the modulated light as an output light signal, a driver for modulator outputting a control signal for controlling an operation related to the modulation according to an input electric signal input from an outside to the light modulator, a light branching circuit branching the output light signal output from the light modulator, and a bias control circuit applying a bias voltage to the light modulator based on the branched output light signal, the apparatus further comprising:

a burst pause state detection circuit detecting a pause state of a burst signal included in the input electric signal;

a photoelectric transducer converting an output light signal branched by the light branching circuit into an electric signal;

a sampling circuit extracting the electric signal converted by the photoelectric transducer while the pause state is detected by the burst pause state; and a bias voltage adjustment circuit adjusting a bias voltage value of the bias voltage based on a voltage level of the extracted electric signal.

2. The light modulation apparatus as claimed in claim 1, wherein the bias voltage adjustment circuit sets a plurality of voltage values different from one another, and compares voltage levels of electric signals extracted according to the plurality of bias voltage values with one another to specify a bias voltage value by which the voltage levels take a minimum or a maximum.

3. The light modulation apparatus as claimed in claim 1, wherein the light modulator and the driver for modulator are connected to each other by direct-current coupling.

4. A light modulator control method for a light modulation apparatus which includes a Mach-Zehnder type light modulator performing modulation of a light entered from a light source to output the modulated light as an output light signal, a driver for modulator outputting a control signal for controlling an operation related to the modulation according to an input electric signal input from an outside to the light modulator, a light branching circuit branching the output light signal output from the light modulator, and a bias control circuit applying a bias voltage to the light modulator based on the branched output light signal, the method comprising the steps of:

detecting a pause state of a burst signal included in the input electric signal;

converting an output light signal branched by the light branching circuit into an electric signal;

extracting the electric signal converted by the photoelectric transducer while the pause state is detected by the burst pause state; and adjusting a bias voltage value of the bias voltage based on a voltage level of the extracted electric signal.

5. The light modular control method as claimed in claim 4, wherein the step of adjusting the bias voltage value sets a plurality of bias voltage values different from one another, and compares voltage levels of electric signals extracted according to the plurality of bias voltage values with one another to specify a bias voltage value by which the voltage levels take a minimum or a maximum.

* * * * *